US008820065B2

(12) United States Patent  
Heren

(10) Patent No.: US 8,820,065 B2  
(45) Date of Patent: Sep. 2, 2014

(54) SUPPLEMENTARY BOOSTING FOR HYDROSTATIC TRANSMISSION CIRCUIT

(75) Inventor: Jean Heren, Margny les Compiegne (FR)

(73) Assignee: Poclain Hydraulics Industrie, Verberie (FR)

( * ) Notice: Subject to any disclaimer, the term of this patent is extended or adjusted under 35 U.S.C. 154(b) by 932 days.

(21) Appl. No.: 12/966,893

(22) Filed: Dec. 13, 2010

(65) Prior Publication Data

US 2012/0144820 A1 Jun. 14, 2012

(30) Foreign Application Priority Data

Dec. 14, 2009 (FR) ...................................... 09 58912

(51) Int. Cl.
*F16H 61/40* (2010.01)
*B60K 17/10* (2006.01)

(52) U.S. Cl.
USPC ........................................... 60/424; 180/308

(58) Field of Classification Search
USPC ............. 60/464, 468, 486; 180/242, 307, 308
See application file for complete search history.

(56) References Cited

U.S. PATENT DOCUMENTS

| 6,263,670 B1 * | 7/2001 | Gluck et al. | ..................... 60/464 |
| 6,354,392 B1 * | 3/2002 | Cousin et al. | ................. 180/242 |
| 6,991,058 B2 * | 1/2006 | Cousin et al. | ................. 180/242 |
| 7,406,824 B2 * | 8/2008 | Lucienne et al. | ............... 60/464 |
| 8,347,620 B2 * | 1/2013 | Yu et al. | ........................... 60/464 |
| 8,356,479 B2 * | 1/2013 | Essig | ............................... 60/468 |
| 2010/0018200 A1 * | 1/2010 | Prigent et al. | ................... 60/484 |
| 2010/0043422 A1 * | 2/2010 | Loewe et al. | ................... 60/424 |

FOREIGN PATENT DOCUMENTS

| EP | 1431627 | 6/2004 |
| FR | 2861448 | 4/2005 |
| FR | 2913218 | 9/2008 |

* cited by examiner

*Primary Examiner* — Thomas E Lazo

(74) *Attorney, Agent, or Firm* — Blakely Sokoloff Taylor & Zafman

(57) ABSTRACT

The present invention relates to a hydrostatic transmission closed circuit comprising
  a fluid tank (50),
  a hydraulic pump (12; 212),
  a first engine assembly (20; 220) and a second engine assembly (30, 40; 230), said first and second engine assemblies (30, 40; 230), each comprising at least one hydraulic engine,
  a booster pump (14; 214),
  an exchange unit (60; 260),
said circuit being characterised in that it also comprises a supplementary boosting line (150; 350) which removes fluid at the outlet of the exchange unit (60; 260) and boosts the hydrostatic transmission circuit at the level of the series line (104; 204).

8 Claims, 3 Drawing Sheets

FIG. 1 --PRIOR ART--

SUPPLEMENTARY BOOSTING FOR HYDROSTATIC TRANSMISSION CIRCUIT

GENERAL TECHNICAL FIELD

The invention relates to the field of hydrostatic transmission circuits, in particular for industrial machines or industrial vehicles.

More precisely, the present invention relates to the field of circuits designed to supply hydraulic engines.

PRIOR ART

Figure 1:
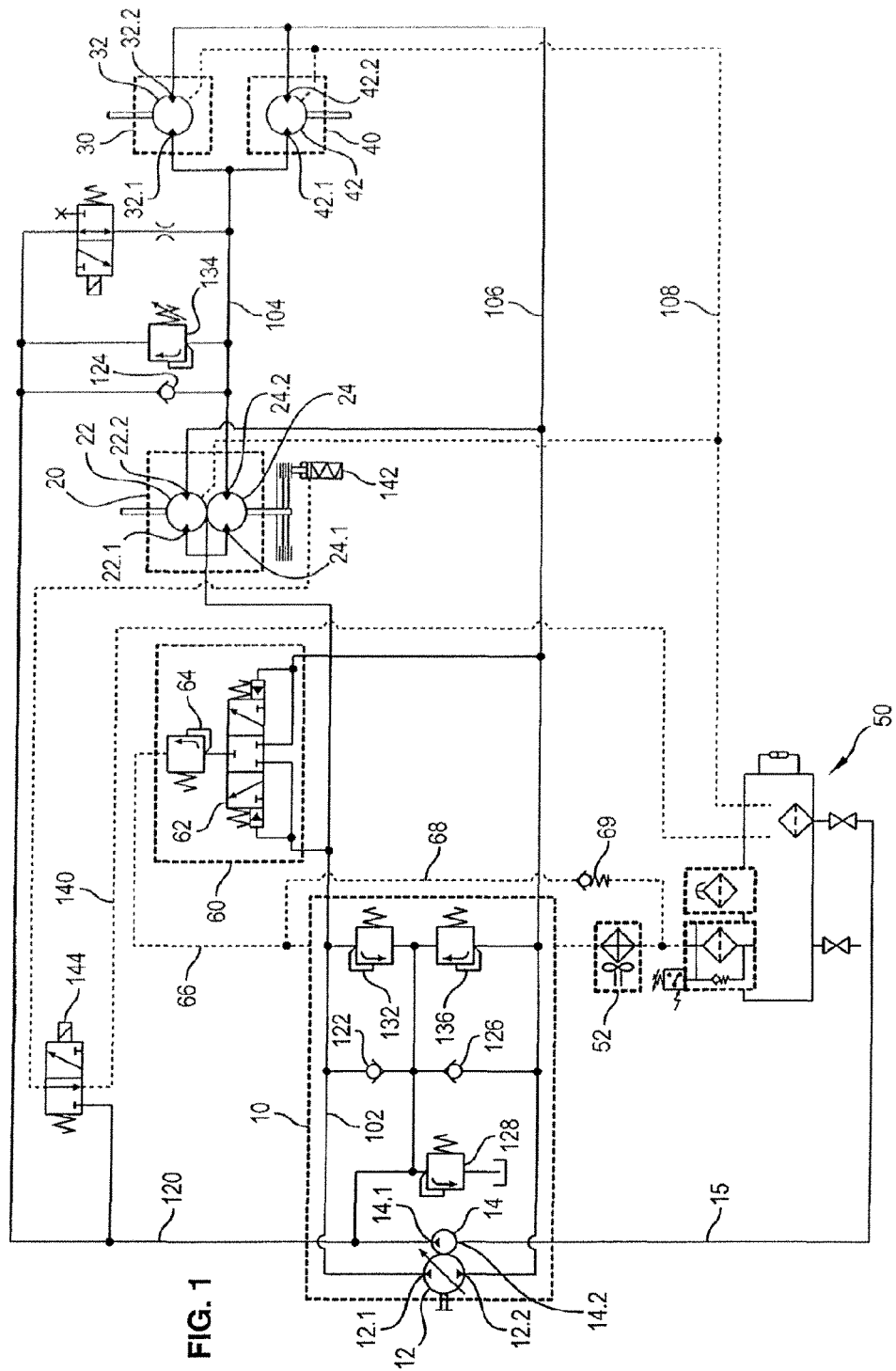

FIG. 1 presents a hydrostatic transmission closed circuit according to the prior art, typically used for industrial machines or engines such as construction, agricultural or heavy weight-handling engines.

The closed circuit presented in FIG. 1 comprises a pump module 10, a first hydraulic engine unit 20, a second hydraulic engine unit 30, a third hydraulic engine unit 40, a fluid tank 50, and an exchange unit 60.

Typically, the fluid contained in the fluid tank 50 is oil.

The pump module 10 comprises a variable-flow hydraulic pump 12 and a booster pump 14.

In the embodiment illustrated, the first engine unit 20 comprises two hydraulic engines 22 and 24 mounted in parallel, and designated respectively hereinbelow as first 22 and second 24 elementary engine of the first engine unit 20, these two elementary engines 22 and 24 being located on the same transmission shaft.

The second engine unit 30 comprises a hydraulic engine 32 designated hereinbelow as second engine 32.

The third engine unit 40 comprises a hydraulic engine 42, designated hereinbelow as third engine. 42.

Each of the hydraulic engines, elementary engines and pumps comprises two connections, which can be used at inlet or outlet according to the operating mode.

The hydraulic pump 12 is connected by its first connection 12.1 to the first engine unit 20 by a supply line 102, and feeds the two elementary engines 22 and 24 of the first engine unit 20 via their first connections, respectively 22.1 and 24.1. The first elementary engine 22 is then connected via its second connection 22.2 to a return line 106, which is connected to the second connection 12.2 of the hydraulic pump 12.

A series line 104 then connects the second connection 24.2 of the second elementary engine 24 of the first engine unit 20 to each of the first connections, respectively 32.1 and 42.1 of the second engine 32 and of the third engine 42. These two engines 32 and 42 each mounted directly in series with the second elementary engine 24 of the first engine unit 20 are mounted in parallel to each other.

The second engine 32 and the third engine 42 are then connected to the hydraulic pump 12 via the return line 106 which is connected to their second connections, respectively 32.2 and 42.2.

According to a particular embodiment, the engines are connected according to a link called Twin-Lock, such as known from the prior art, for combining the advantages of links of parallel and series type for hydraulic engines. In fact, conventionally, hydraulic engines are mounted in series or in parallel, these two types of mounting having distinct advantages and disadvantages.

A series link between two hydraulic engines turns these two engines at the same speed if their cylinders are identical, but has disadvantages with respect to distribution of torque, which is limited to the torque of the first of said engines en the series line, and has no different rotation speeds, especially in turns.

A parallel link between two hydraulic engines has as such different engine rotation speeds, but offers disadvantages in terms of skidding; torque is limited to the lowest torque value of the two hydraulic engines.

The housings of the engines 22, 24, 32 and 42 are connected to a leakage line 108, for conveying fluid losses in these engines to the fluid tank 50. Such a leakage line is typically connected to the engine housings, in which fluid losses are collected.

The exchange unit 60 comprises two inlets and an outlet, the two inlets being connected respectively to the supply line 102 and to the return line 106, and the outlet being connected to an exchange line 66.

In the embodiment illustrated, the exchange unit 60 comprises an exchange spool 62 and a valve 64 mounted in series.

The exchange spool 62 comprises two inlets and an outlet, and the valve 64 comprises an inlet and an outlet. The two inlets of the exchange spool 62 are connected to the two inlets of the exchange unit 60, and its outlet is connected to the inlet of the valve 64, the valve 64 being connected at the other end by its outlet to the outlet of the exchange unit 60.

The exchange spool 62 comprises three positions for defining the links between two inlet paths and one outlet path, the position employed being defined by the difference in pressure in the two inlet paths.

In the embodiment illustrated in FIG. 1, the exchange unit 60 is adapted for removing fluid in the line having the lowest pressure between the supply line 102 and the return line 106 so as not to penalise the transmission output.

The exchange spool 64 as such has a pressure limitation function, at a. level slightly less than that of the booster valve 128.

More generally, the exchange unit 60 produces a fluid outlet, and can for example comprise leak jets, or any other means adapted to remove fluid from the closed circuit.

Removing fluid in this way from the closed circuit refreshes the fluid which is circulating, the fluid outlets by the exchange unit 60 being compensated by the booster pump 14 which reinjects fluid removed to the fluid tank 50.

In the embodiment illustrated, the fluid originating from the exchange unit 60 is injected into the pump module 10, for example in a housing of this pump module 10, prior to being cooled by fluid-cooling means 52 then reinjected into the fluid tank 50.

In the event of excess pressure in the exchange line 66, a bypass line 68 directly injects the fluid from the exchange line 66 into the fluid tank 50 via a check valve 69 acting as pressure limiter.

The booster pump 14 boosts the hydrostatic transmission circuit at the level of the series line 104, and in the line having the lowest pressure of the supply line 102 and the return line 106.

The booster pump 14 is connected to a boosting line 120 via its first connection 14.1, said boosting line 120 connecting the booster pump to the supply line 102, the series line 104 and the return line 106 via check valves, respectively 122, 124 and 126.

The supply line 102, the series line 104 and the return line 106 are likewise connected to the boosting line 120 via valves limiting the pressure in these lines, respectively 132, 134 and 136.

A brake circuit 140 passes via the boosting line 120, and actuates a brake 142 of the first engine unit 20 when a brake command 144 is actuated.

This brake command conveys fluid from the boosting line 120 to the brake 142, which then acts on the first engine unit 20. This system functions by anti-skid, that is, the brake is applied when there is no pressure in the line 140, resulting automatically in braking of the machine when the pump module is stopped.

The booster pump 14 is likewise used by the control means of the position of the wobble plate of the variable-flow pump 12. These means are internal to the pump module 10 and are not shown.

The booster pump 14 is fed with fluid by way of an inlet line 15 connected to the second connection 14.2 of the booster pump 14, which connects the booster pump 14 to the fluid tank 50.

In the event of excess pressure in the boosting line 120, a valve 128 removes fluid from this boosting line, typically by sending it back to the tank 50 (Even though there are several small tanks shown in the figures, this is a single tank.), either via the line 52, or via 68 and 69.

By way of a feed pump 12, this circuit supplies three engine units 20, 30 and 40 with fluid, here mounted according to Twin-Lock technology. A booster pump 14 supplies a boosting line 120, which ensures adequate fluid pressure in the circuit, and compensates losses by injecting into the circuit fluid removed in a fluid tank 50, and likewise ensures the rate of exchange via the unit 60. (a conduit not numbered starting from the booster pump 14, passing through the valves 122 and 126, the line 106 or 102, the exchange unit 60). For this to happen, the valve 128 is calibrated at a level of pressure greater than the valve 64.

This circuit does have disadvantages in some operating modes. In fact, boosting can prove inadequate during turns, or when the machine goes lowly and the thermal drive engine of the pump idles. The drop in boosting pressure which ensues can cause inopportune application of the brakes 142, and likewise perturb control of the flow-control wobble plate of the hydraulic variable-flow pump 12. These organs can no longer ensure their functions at preferred levels of performance and cause vibrations and aftershocks on the machine.

A conventional method for responding to these disadvantages consists of using a booster pump of superior capacity; but this causes an increase in the bulk of the circuit as well as the cost of the circuit, due to the cost of the pump itself, and to its higher operating cost.

PRESENTATION OF THE INVENTION

The present invention proposes responding to this problem, and proposes a closed hydrostatic transmission circuit comprising
- a fluid tank,
- a hydraulic pump,
- a first engine assembly and a second engine assembly, said first and second engine assemblies, each comprising at least one hydraulic engine, said first engine assembly being connected to the hydraulic pump by a supply line, and being mounted in series with said second engine assembly via a series line, said second engine assembly being connected to the hydraulic pump by a return line,
- a booster pump which removes fluid in the fluid tank and boosts the closed circuit at the level of the series line,
- an exchange unit connected to the closed circuit, and which extracts therefrom a volume of fluid injected by the booster supplementary pump, said circuit being characterized in that it also comprises a boosting line which removes fluid at the outlet of the exchange unit and boosts the hydrostatic transmission circuit at the level of the series line.

According to a particular embodiment, the supplementary boosting line comprises a check valve adapted so that fluid can flow only in the direction of the supplementary boosting line to the series line.

According to another particular embodiment, the first engine assembly comprises two hydraulic elementary engines on the same transmission shaft, the first of these two elementary engines being connected to the hydraulic pump by the return line, and the second of these two elementary engines being connected by the series line to the second engine assembly.

According to a particular embodiment, the second engine assembly comprises two hydraulic engines mounted in parallel relative to one another.

According to a particular embodiment, the exchange unit comprises an exchange spool and a valve in series, said boosting line being connected to the exchange unit at a point located between said slide valve and said valve.

According to a variant of this particular embodiment:
- said exchange unit comprises two inlets and an outlet,
- said exchange spool comprises two inlets and an outlet,
- said valve of said exchange unit comprises an inlet and an outlet, said two inlets of the exchange unit being connected to the two inlets of the exchange spool,
- an outlet of the exchange spool being connected to the inlet of the valve of the exchange unit,
- an outlet of the valve of the exchange unit being connected to the outlet of the exchange unit.

According to a variant of this particular embodiment:
- the first inlet of the exchange unit is connected to the supply line on the one hand, and to the first inlet of the exchange spool on the other,
- the second inlet of the exchange unit is connected to the return line on the one hand, and to the second inlet of the exchange spool on the other,
- said exchange spool comprising three positions:
  - a first position in which the first inlet of the exchange spool is closed, and the second inlet of the exchange spool is connected to the outlet of the exchange spool,
  - a second position in which the first inlet of the exchange spool, the second inlet of the exchange spool, and the outlet of the exchange spool are closed,
  - a third position in which the first inlet of the exchange spool is connected to the outlet of the exchange spool, and the second inlet of the exchange spool is closed.

According to another particular embodiment, the engines are radial piston engines marketed by the company Poclain Hydraulics.

PRESENTATION OF FIGURES

Other characteristics, aims and advantages of the invention will emerge from the following description, which is purely illustrative and non limiting, and which must be considered in conjunction with the attached diagrams, in which:

FIG. 1 described previously presents a hydrostatic transmission circuit according to the prior art.

Figure 2:
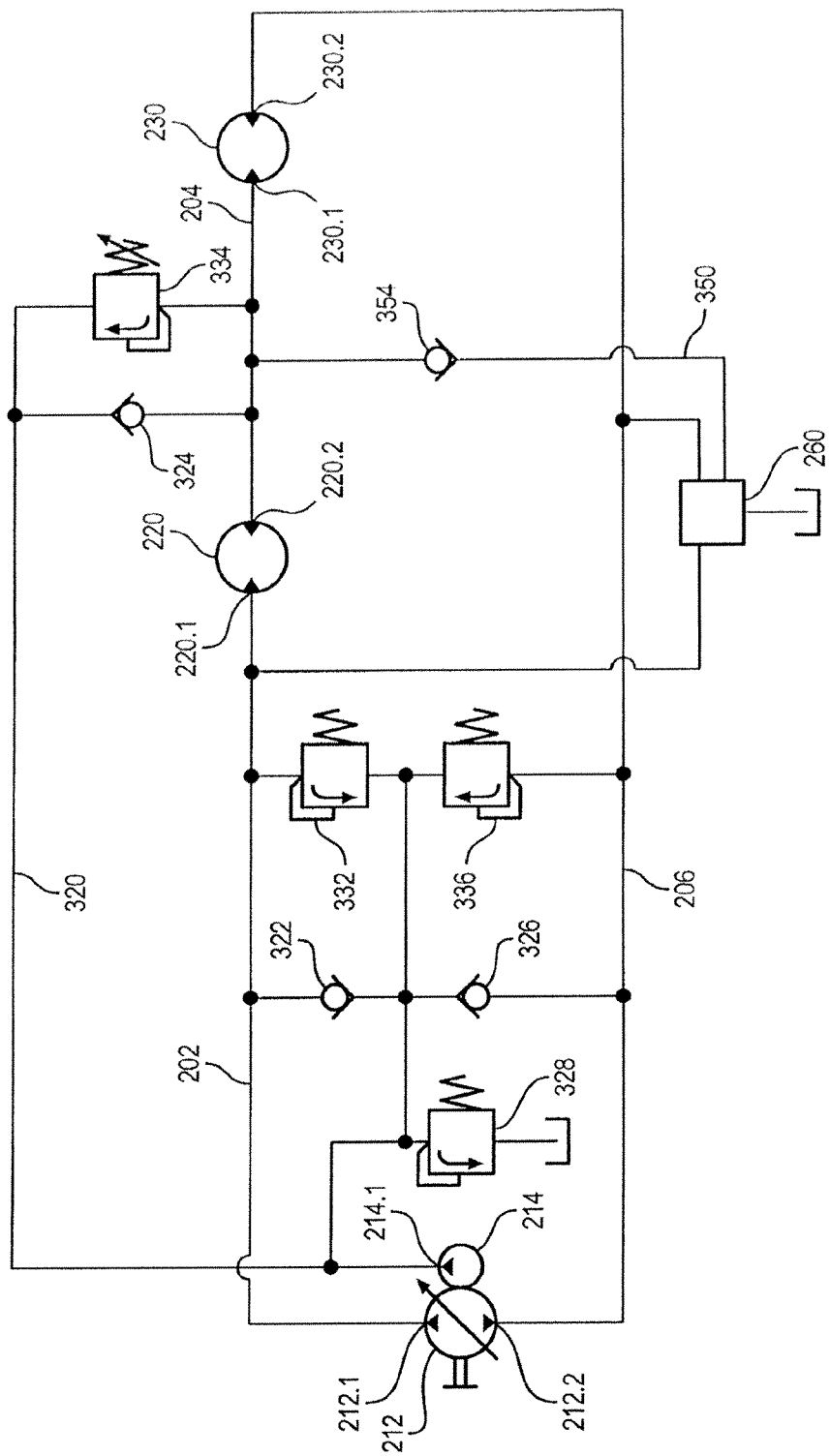

FIG. 2 presents a hydrostatic transmission circuit according to the invention.

Figure 3:
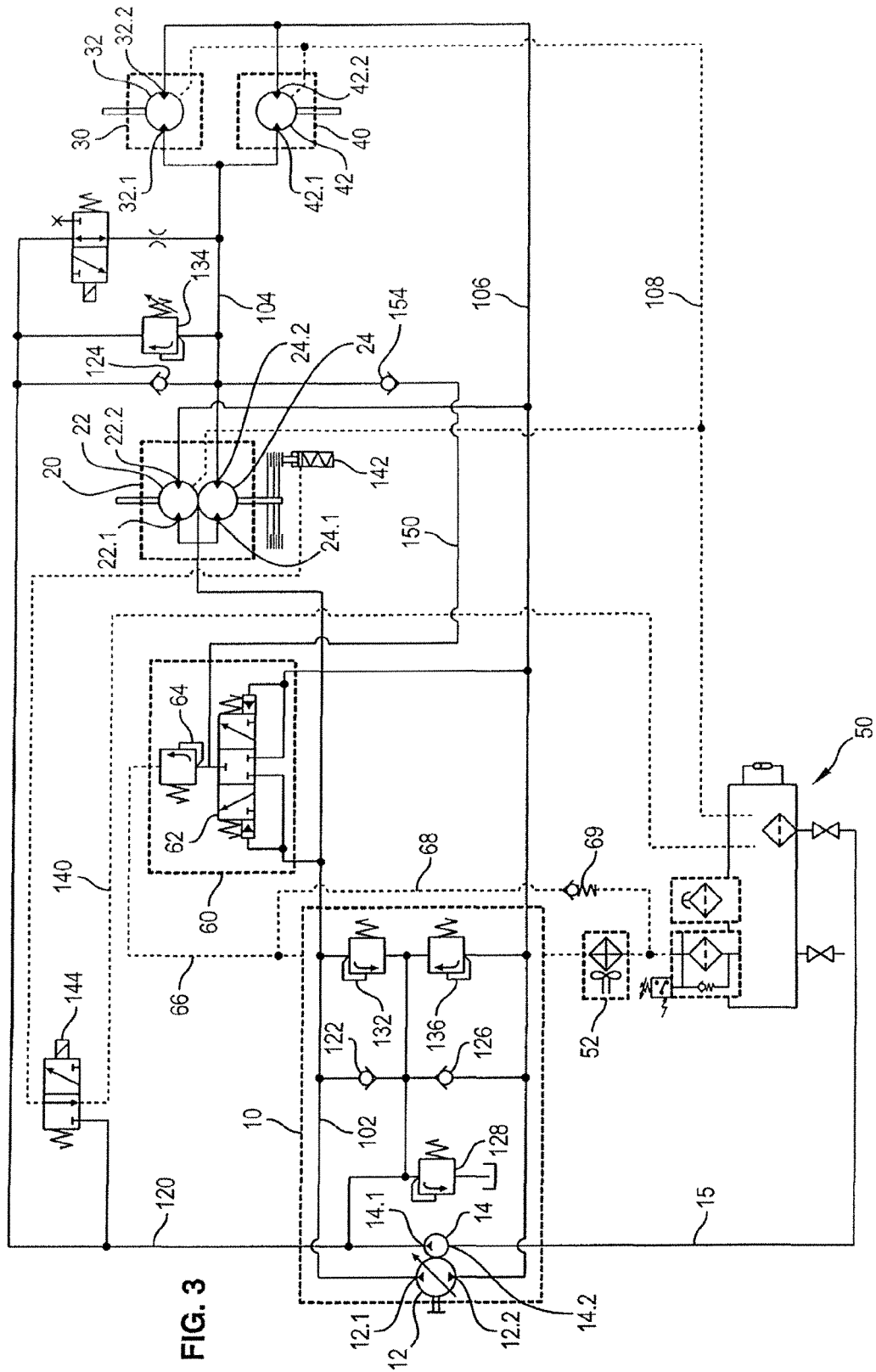

FIG. 3 presents a particular embodiment of the invention.

DETAILED DESCRIPTION

FIG. 2 presents a hydrostatic transmission circuit according to the invention.

The circuit illustrated in FIG. 2 comprises a hydraulic pump 212, a first hydraulic engine 220, a second hydraulic engine 230, and a booster pump 214.

Each of the hydraulic engines and pumps comprises two connections which can be used as inlet or outlet according to the operating mode.

The hydraulic pump 212 is connected by its first connection 212.1 to a supply line 202 which is likewise connected to the first connection 220.1 of the first hydraulic engine 220.

The first hydraulic engine 220 is connected by its second connection 220,2 to a series line 204 which is likewise connected to the first connection 230.1 of the second hydraulic engine 230.

The second hydraulic engine 230 is connected by its second connection 230.2 to a return line which is then connected to the second connection 212.2 of the pump 212. The booster pump 214 is connected by its connection 214.1 to a boosting line 320 which is then connected to the series line 204 to enable boosting of this series line 204.

The boosting line comprises a check valve 324, as well as a valve 334 for limiting the pressure in the series line 204. The boosting line is likewise connected to the supply line 202 and to the return line 206, these links being likewise fitted with check valves, respectively 322 and 326, and valves, respectively 332 and 336.

A valve 328 limits the pressure in the boosting line 320, and removes fluid from this boosting line in the event of excessive pressure, typically by sending this fluid back to a fluid tank.

The circuit likewise comprises fluid exchange means 260, designed to remove fluid in the supply line 202 and/or in the return line 206, and remove fluid removed from the circuit, typically to allow cooling and/or refreshing of the fluid.

A supplementary boosting line 350 according to the present invention is added, and connects the fluid exchange means 260 to the series line 204.

This supplementary boosting line 350 is typically fitted with a check valve 354 to provide circulation of fluid only in the direction of the supplementary boosting line 350 to the series line 204.

Such a supplementary boosting line 350 ensures adequate boosting of the hydraulic control circuit, without requiring the use of an oversized booster pump, enabling economising at the same time in terms of the booster pump per se; but likewise in terms of its function and its bulk.

In addition, this supplementary boosting line 350 requires no installation of complex or bulky supplementary components in the circuit, and requires only the addition of a fluid line between two elements.

The circuit presented in FIG. 2 thus feeds two hydraulic engines 220 and 230 mounted in series, and ensures adequate boosting especially during turns, or when the machine goes slowly and the engines and pumps are idling, without the need for oversizing the booster pump 214.

FIG. 3 presents an application of the invention to the hydrostatic circuit presented in FIG. 1.

This FIG. 3 shows elements already described for FIG. 1, these elements being designated by the same reference numeral as for FIG. 1. This circuit also comprises a supplementary boosting line 150 such as presented in FIG. 2, which connects the exchange unit 60 to the series line 104 via a supplementary check valve 154.

In the embodiment illustrated, the link point with the supplementary boosting line 150 is located between the outlet of the exchange spool 62 and the inlet of the valve 64 of the exchange unit 60.

This supplementary boosting line 150 thus removes fluid initially destined to be sent to the exchange line 66, and reinjects it into the series line 104.

As mentioned earlier in the description of FIG. 1, the fluid passing through the exchange unit 60 originates from the line having the lowest pressure of the supply line 102 and the return line 106 so as not to penalise the motor control of the engines.

In the embodiment represented in FIG. 3, the supplementary boosting line 150 comprises a supplementary check valve 154, adapted so that fluid can flow only in the direction of the supplementary boosting line 150 to the series line 104.

Having the supplementary boosting line takes advantage of existing components which are likely to comprise connections not used by conventional components of the circuit, and which can thus be exploited for adding this supplementary boosting line 150.

More generally, the supplementary boosting line 150 can be connected to an exchange unit 60 such as represented in the figures, or at any other element for removing fluid from the closed circuit.

The invention applies particularly to hydrostatic transmission circuits in which the engines are hydraulic engines with radial pistons and multilobe cams, also called high-torque and low-speed engines.

The invention claimed is:

1. A hydrostatic transmission closed circuit, comprising
   a fluid tank (50),
   a hydraulic pump (12; 212),
   a first engine assembly (20; 220) and a second engine assembly (30, 40; 230), said first and second engine assemblies (30, 40; 230), each comprising at least one hydraulic engine, said first engine assembly (20; 220) being connected to the hydraulic pump (12; 212) by a supply line (102; 202), and being mounted in series with said second engine assembly (30, 40; 230) via a series line (104; 204), said second engine assembly (30, 40; 230) being connected to the hydraulic pump (12; 212) by a return line (106; 206),
   a booster pump (14; 214) which removes fluid in the fluid tank (50) and boosts the closed circuit at the level of the series line (104; 204),
   an exchange unit (60; 260) connected to the closed circuit, and which extracts therefrom a volume of fluid injected by the booster pump (14; 214),
   said circuit also comprising a supplementary boosting line (150; 350) which removes fluid at the outlet of the exchange unit (60; 260) and boosts the hydrostatic transmission circuit at the level of the series line (104; 204).

2. The hydrostatic transmission circuit as claimed in claim 1, wherein the supplementary boosting line comprises a check valve adapted so that fluid can flow only in the direction of the supplementary boosting line to the series line.

3. The hydrostatic transmission circuit as claimed in claim 1, wherein the first engine assembly comprises two elementary hydraulic engines on the same transmission shaft, the first of these two elementary engines being connected to the hydraulic pump by the return line, and the second of these two elementary engines being connected by the series line to the second engine assembly.

4. The hydrostatic transmission circuit as claimed in claim 1, wherein said second engine assembly comprises two hydraulic engines mounted in parallel relative to one another.

5. The hydrostatic transmission circuit as claimed in claim 1, wherein said exchange unit comprises an exchange spool and a valve in series, said boosting line being connected to the exchange unit at a point located between said slide valve and said valve.

6. The hydrostatic transmission circuit as claimed in claim 5, wherein:
said exchange unit comprises two inlets and an outlet,
said exchange spool comprises two inlets and an outlet,
said valve of said exchange unit comprises an inlet and an outlet,
said two inlets of the exchange unit being connected to the two inlets of the exchange spool,
an outlet of the exchange spool being connected to the inlet of the valve of the exchange unit,
an outlet of the valve of the exchange unit being connected to the outlet of the exchange unit.

7. The hydrostatic transmission circuit as claimed in claim 6, wherein:
the first inlet of the exchange unit is connected to the supply line on the one hand, and to the first inlet of the exchange spool on the other,
the second inlet of the exchange unit is connected to the return line on the one hand, and to the second inlet of the exchange spool on the other, said exchange spool comprising three positions:
a first position in which the first inlet of the exchange spool is closed, and the second inlet of the exchange spool is connected to the outlet of the exchange spool,
a second position in which the first inlet of the exchange spool, the second inlet of the exchange spool, and the outlet of the exchange spool are closed,
a third position in which the first inlet of the exchange spool is connected to the outlet of the exchange spool, and the second inlet of the exchange spool is closed.

8. The hydrostatic transmission circuit as claimed in claim 1, wherein said engines are hydraulic engines with radial pistons and multilobe cams.

* * * * *